United States Patent
Phillips et al.

(10) Patent No.: US 8,810,855 B1
(45) Date of Patent: Aug. 19, 2014

(54) ERASABLE PRINTOUTS INCLUDING ERASABLE FEATURES

(71) Applicant: Hewlett-Packard Development Company, L.P., Houston, TX (US)

(72) Inventors: Quintin T. Phillips, Boise, ID (US); Dennis A. Abramsohn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/754,595

(22) Filed: Jan. 30, 2013

(51) Int. Cl.
*H04N 1/60* (2006.01)
*G06K 15/02* (2006.01)

(52) U.S. Cl.
CPC .................................. *G06K 15/1881* (2013.01)
USPC .......... 358/1.9; 358/3.13; 358/3.15; 358/3.28

(58) Field of Classification Search
None
See application file for complete search history.

(56) References Cited

U.S. PATENT DOCUMENTS

| 5,612,766 | A | 3/1997 | Iida et al. |
| 6,529,704 | B1 | 3/2003 | Kurita et al. |
| 7,283,758 | B2 * | 10/2007 | Murakami ...................... 399/45 |
| 2003/0113144 | A1 | 6/2003 | Kanazawa et al. |
| 2010/0229889 | A1 | 9/2010 | Shrader |
| 2011/0199625 | A1 * | 8/2011 | Sugimoto et al. .............. 358/1.9 |
| 2011/0305851 | A1 | 12/2011 | Wang et al. |
| 2012/0038941 | A1 * | 2/2012 | Megawa ...................... 358/1.13 |
| 2013/0070305 | A1 * | 3/2013 | Tomizawa et al. ........... 358/3.28 |

FOREIGN PATENT DOCUMENTS

JP  07239635 A  *  9/1995  ............. G03G 21/00

* cited by examiner

*Primary Examiner* — Dung Tran
(74) *Attorney, Agent, or Firm* — Aaron S. Ward

(57) ABSTRACT

A logic module is to identify whether to print a standard printout or an erasable printout. A print module is to print the erasable printout in response to the identifying by the logic module. The erasable printout includes an erasable feature not present in the standard printout.

14 Claims, 6 Drawing Sheets

ERASABLE PRINTOUTS INCLUDING ERASABLE FEATURES

BACKGROUND

Printing onto media, e.g., paper, as single-use printouts may result in increased media costs and consumption of environmental resources. Printing as multiple-use printouts may be possible using thermal inks that respond to thermal conditioning to change color. However, such multiple-use printouts are not fully erasable, and are associated with other limitations such as increased costs and limited number of repeat printing on a given media.

BRIEF DESCRIPTION OF THE DRAWINGS/FIGURES

DETAILED DESCRIPTION

Examples provided herein demonstrate various approaches to provide erasable printouts. For example, an erasable printout may include an erasable feature that may facilitate cleaning or removal of the erasable feature from a printable media substrate. Example erasable features may be based on how an apparatus is to print, including rendering (e.g., software and drivers), fusing, and other techniques. Various parameters may be used to facilitate erasure, including adjusted visual appearance, physically adjusted marking material (e.g., toner) pile characteristics, physical features of the marking material used, and other parameters. Output produced by an example apparatus may be more easily removable from the media, such that printouts may be erasable and media may be reusable. Erasable printouts therefore may save printing costs and conserve environmental resources.

Figure 1:
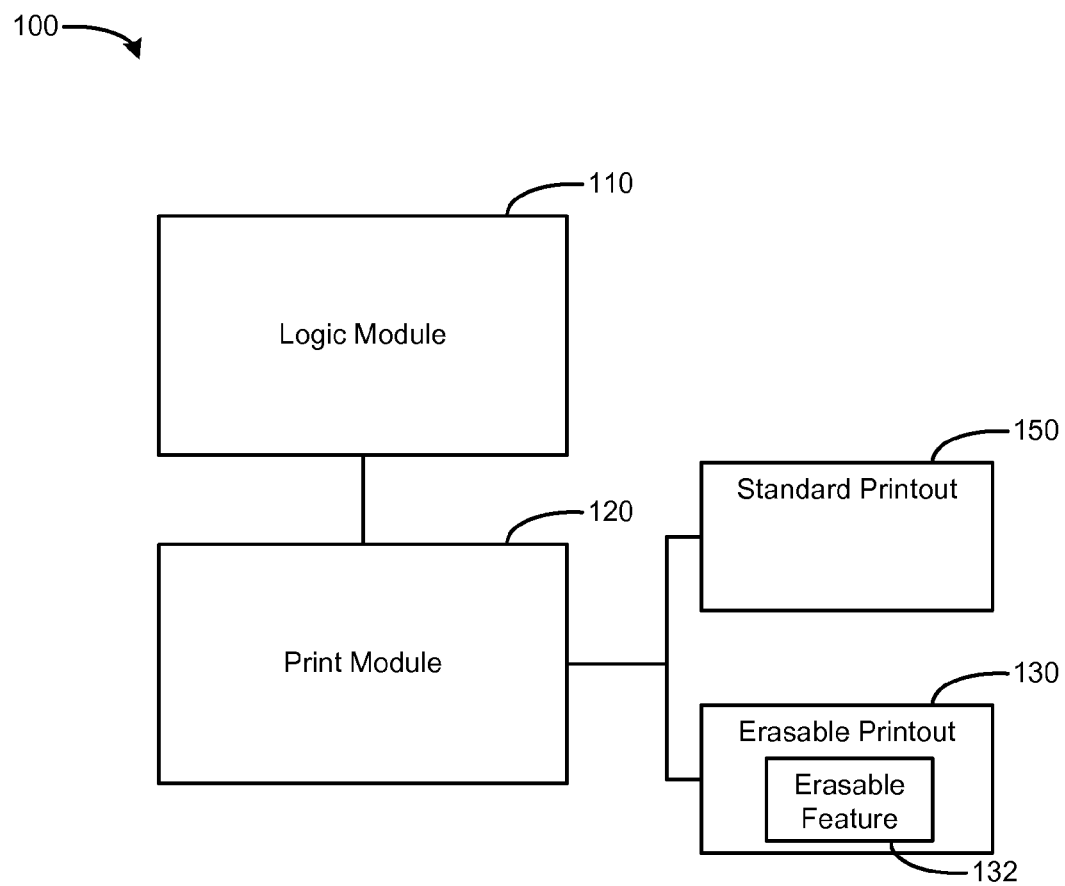
FIG. 1 is a block diagram of an apparatus including a print module according to an example.

FIG. 1 is a block diagram of an apparatus 100 including a print module 120 according to an example. The apparatus 100 also includes a logic module 110 coupled to the print module 120. The print module 120 is to provide a standard printout 150 and/or an erasable printout 130. The erasable printout 130 is to include an erasable feature 132. Although shown as two separate blocks, in alternate examples, the logic module 110 and print module 120 may be provided as a single computer program. Further, although FIG. 1 shows standard printout 150 and erasable printout 130, in alternate examples, the standard printout 150 may be omitted such that the apparatus 100 may provide erasable printout 130 without providing standard printout 150.

Examples of apparatus 100 may help facilitate multiple uses of a single sheet of media, thus reducing the cost and environmental impact of printing a document, e.g., based on erasable printout 130 being reusable. In an example, desired information, such as an image and/or text, may be rendered on a sheet of media for printout as an erasable printout 130. The erasable printout 130 then may be enjoyed as though it were a standard printout 150, e.g., by reading it, storing it, and so on. The erasable printout 130 then may be erased for re-use, e.g., by feeding the sheet into an erasing device (not shown) to disturb and/or remove the erasable feature 132 from the media page of the erasable printout 130, rendering the media ready for re-use.

The logic module 110 may direct the print module 120 to provide a standard printout 150 and/or an erasable printout 130. In an example, the printouts may be associated with different features, such as printing speed. The logic module 110 may include an option whether to cause the print module 120 to print the standard printout 150 or the erasable printout 130. The logic module 110 may automatically select a type of printout to provide, based on available print media (e.g., by detecting available print media, such as a status of a printer tray and whether it is empty or nonempty). The print module 120 may perform functions such as rendering and/or printing, or other functions, to provide the printouts.

The erasable printout 130 may be erasable based on erasable feature 132. In an example, the erasable printout 130 may be fed into an erasing device that removes the printed image from the media page, readying the page for use as an "equivalent to new" sheet of media. Erasing the erasable printout 130, e.g., by removal of the image marking material such as toner, may be facilitated by rendering the image in a manner that makes the marking material more easily removed from the media. The term "toner" will be used as an example of marking material. However, marking materials are not limited to toner, and references to toner may extend to and include other forms of marking materials, such as ink, dye, and so on.

Figure 2:
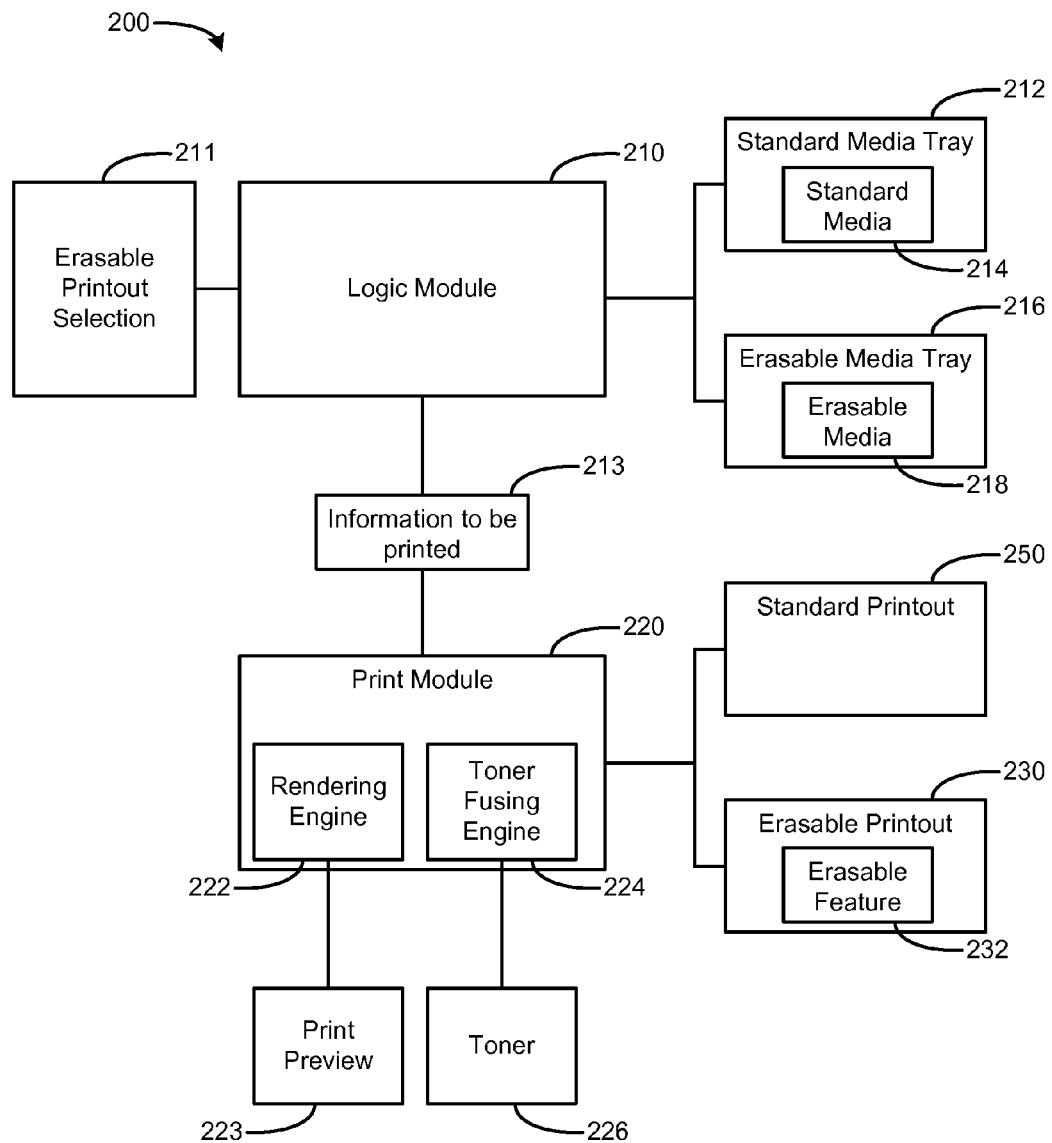
FIG. 2 is a block diagram of an apparatus including a print module according to an example.

FIG. 2 is a block diagram of an apparatus 200 including a print module 220 according to an example. The apparatus 200 also may include logic module 210 coupled to the print module 220. The logic module may be associated with erasable printout selection 211, standard media tray 212 (that may include standard media 214), erasable media tray 216 (that may include erasable media 218), and information to be printed 213. The print module may be associated with rendering engine 222, print preview 223, toner fusing engine 224, toner 226, standard printout 250, and erasable printout 230 including erasable feature 232.

The apparatus 200 may represent an existing (e.g., "standard") printer that may be controlled to print erasable feature 232 onto erasable media 218 that is compatible with being fed into the existing printer. The apparatus 200 also may represent a "next generation" printer that may print erasable feature 232 and also may include functionality to erase the erasable feature 232 (e.g., include a printout disturber system, not shown in FIG. 2). For example, such a next generation printer may print an erasable printout 230, and also may receive an erasable printout 230 that is erased to provide erasable media 218 for reuse by the next generation printer.

Apparatus 200 may receive standard media 214 in standard media tray 212, and may receive erasable media 218 in erasable media tray 216 (other trays, not shown, may be used). Thus, logic module 210 may identify an erasable printout selection 211, and determine whether to use the standard media tray 212 and/or the erasable media tray 216. In an example, the logic module 210 may receive input from a user, e.g., via a printer driver user selection, to identify the erasable printout selection 211. In an alternate example, the logic module 210 may identify the erasable printout selection 211 automatically, based on available standard media 214 and/or available erasable media 218. The erasable printout selection 211 may identify a combination of standard media 214 and erasable media 218 to be used in a given print job. For example, the logic module 210 may be included as a software printer driver that enables selection of printing options, e.g., a print job wherein a glossy cover page is to be printed using standard media 214, and remaining contents of the print job are to be printed using erasable media 218.

In an example, the erasable printout selection 211 and/or the logic module 210 may indicate/determine that a printout to be created is to be rendered in an erasable-friendly manner. Thus, various settings for the apparatus 200 (e.g., rendering settings, toner fusing settings) may be adjusted to provide enhanced erasability. Such settings and other information may be contained in the information to be printed 213. The information to be printed 213 may include information to adjust an image, such as instructions to adjust fonts, linewidths, and/or halftones. Thus, in an example the information to be printed 213 may be provided in addition to the raw data for a print job. In an alternate example, the information to be printed 213 may include the raw data as well as the settings information. The information to be printed 213 may be passed to the print module 220.

The print module 220 may include functionality to print a standard printout 250 and/or an erasable printout 230. In an example, the print module 220 may be programmable, e.g., functionality may be added to the print module 220, e.g., by transmitting the functionality to the print module 220 based on a firmware update or other instructions to modify the capabilities of the print module 220. The print module 220 may be capable of receiving such modifications during or after the apparatus 200 has been deployed in the field. The enhanced capabilities of the print module 220 may be provided upon manufacture of the apparatus 200. The enhanced capabilities may be contained as parameters to optimize printing erasable feature 232, which may be provided as an erasable print mode compatible with reusable erasable media 218. Thus, even a standard printer may be provided with the capability to produce an erasable feature 232 to be used for an erasable printout 230.

The print module 220 may provide the erasable print mode based on, e.g., adjusting the rendering engine 222 and/or the toner fusing engine 224. Settings for adjustments may include an amount of toner to be used. For example, the print module 220 may adjust whether to use less or more marking material for creating a given toner pile on a sheet of printout media, to affect the ease with which that toner pile may be mechanically removed from the media sheet. Other adjustments may include using halftones that optimize dot size for erasure, a transfer process to increase line width and halftone densities for easier erasure, optimized color tables to vary the amount of toner in colored areas, fuser settings to create an image that includes an erasable feature, and the ability to expose the system with different lasers and/or light emitting diodes (LEDs). For example, enable use of a new and/or different print engine in the print module 220, including examples having multiple sets of lasers/fusers etc. for use with different print jobs.

The rendering engine 222 may provide a print preview 223. The print preview 223 may be provided graphically to a computer system, so that the print preview 223 may be visually inspected on a display. The print preview 223 may include visual changes to be evident in the erasable printout 230. Such visual changes may include high line screen areas changed to lower line screen areas, narrow lines changed into thicker lines, small serifs removed from text, halftone adjustments, color changes, and other features to be shown in the print preview 223. Such changes to enable erasure may be confirmed by viewing the print preview 223. Image rendering changes may be displayed on a computer display in a "what you see is what you get" (WYSIWYG) manner, for pre-print inspection, adjustment, acceptance, and/or rejection.

The print module 220 also may include a toner fusing engine 224, which may use toner 226. The print module 220 may provide adjustments based on changes to toner 226 and/or toner fusing. For example, the toner fusing engine 224 may use a lower erasable fusing temperature for producing the erasable printout 230, compared to a standard fusing temperature for producing the standard printout 250. The toner fusing engine 224 may use toner 226 that fuses at a higher temperature compared to standard toner, thereby resulting in partially melted toner piles when using the toner 226. The print module 220 may use multiple different toner reservoirs (not shown), including a standard toner reservoir and an erasable toner reservoir.

As with other components described herein (e.g., logic module 210, print module 220), the rendering engine 222 and toner fusing engine 224 may be provided as computer programs, and may be provided on a computer system interfacing with apparatus 200 (e.g., provided as a printer driver to interface with a printer), and/or may be provided on the apparatus 200 itself (e.g., as firmware operating the printer), or any combination thereof.

The print module 220 may provide standard printout 250 and/or erasable printout 230. The standard printout 250 may lack an erasable feature 232. However, the apparatus 200 may provide different performance capabilities when printing different formats. In an example, the apparatus 200 may provide standard printout 250 at a faster rate than the erasable printout 230, by avoiding a need to create the erasable feature 232 on the standard printout 250. The erasable printout 230 may be printed with erasable feature 232 and/or other changes made to the image. The resulting erasable printout 230 is erasable from the erasable media 218 on which it is printed, due to, e.g., physical changes in the image components, dots, and other features being printed on the page.

The example benefits describe herein may be provided as a software driver, a printer, printer settings/printable information, a rendering engine, firmware operating on hardware, or other examples to facilitate providing erasable printout 230. Settings may control printer fusing temperatures, based on a printer engine interface. Settings may be communicated through a software driver and/or through physical hardware interfaces (e.g., buttons, communication ports, and so on) located at the printer. A printer engine may be provided to include separate settings, to enable the printer to provide enhanced capability for printing erasable features 232 for an erasable printout 230.

Figure 3A:
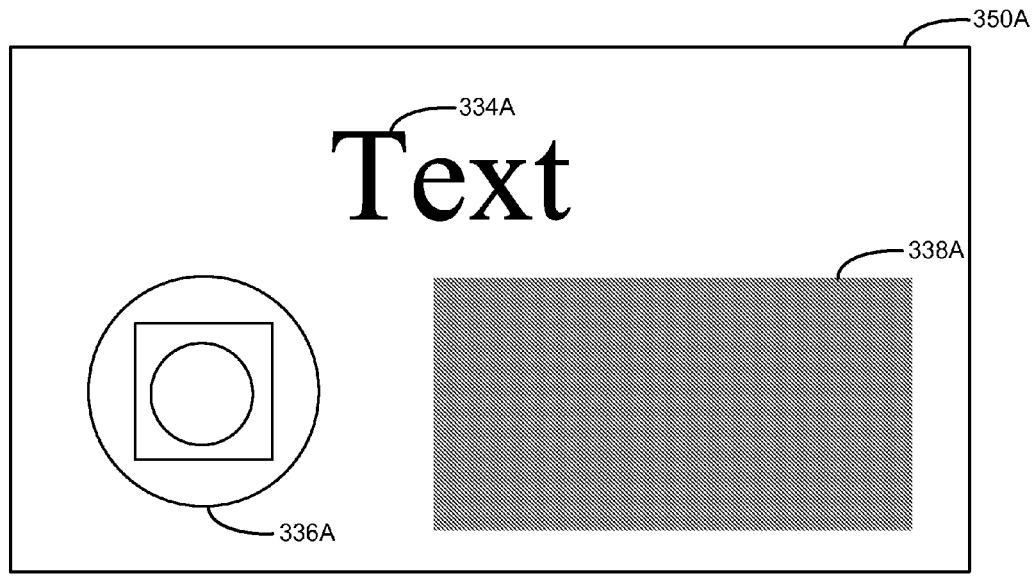
FIG. 3A is a block diagram of a standard printout illustrating a standard feature from a print module according to an example.

FIG. 3A is a block diagram of a standard printout 350A illustrating a standard feature (e.g., font 334A, line 336A, halftone 338A) from a print module according to an example. The font 334A includes sharp edges, such as serifs, whose dimensions are narrow (e.g., converging to a point). Accordingly, standard printout 350 including the font 334A is made up of toner that includes toner lines and/or piles having relatively small dimensions (e.g., relatively small, comparable to a width of a standard toner pile). The line 336A similarly includes relatively thin features causing toner on the standard printout 350A to have relatively small dimensions comparable to a standard toner pile size. The halftone 338A shows a grayscale as rendered on the standard printout 350A. The grayscale is rendered using very small toner dots, e.g., 600 dots per inch (DPI), 1200 DPI, and so on, whose dots are very thin with respect to the print media (paper). The halftone 338A thus may provide a sea of very thin toner dots, each of which is associated with a toner pile width below a threshold value to enable easy erasability.

A high line screen print may create halftone areas (e.g., light gray areas) based on many small dots of toner on the media surface. In a standard printout 350A, it may be that the grayscale 338A is provided at a dot pitch that is below the resolving capability of the human eye at typical viewing distances, to enable a visually smooth grayscale without discernible dots. Thus, in an erasure operation, many small dots may be difficult to remove. For example, many small dots may interact almost like a thin film of toner that is difficult to remove from a print media, unlike a number of fewer and larger toner dots. Thus, such printing features are not conducive to erasable printing.

Figure 3B:
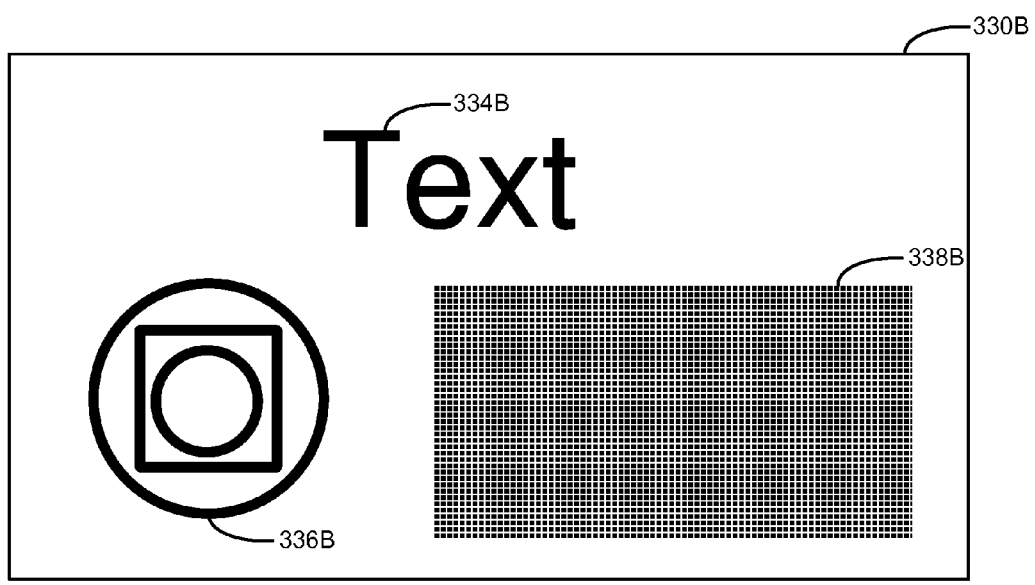
FIG. 3B is a block diagram of an erasable printout illustrating an erasable feature from a print module according to an example.

FIG. 3B is a block diagram of an erasable printout 330B illustrating an erasable feature (e.g., font 334B, line 336B, halftone 338B) from a print module according to an example. Compared to the standard printout 350A of FIG. 3A, the erasable features of FIG. 3B may have thicker lines, fonts without serifs, halftones with reduced dot pitch, and other features conducive to erasability.

The erasable features may be presented at a lower resolution compared to the standard printout 350A. The lower resolution may be enabled based on low line screens, larger dots (e.g., reduced dot pitch, increased threshold toner pile width), and other techniques. Image rendering techniques may be varied to print erasable printout 330B, with flexibility to adjust toner dot width and other features. A logic module and/or print module may identify which aspects may be adjusted more aggressively without detracting from a resulting visual effect. Thus, for example, the erasable dot pitch may be increased to be discernible by the human eye at normal viewing distances, reducing the smoothness of grayscales and the sharpness of lines as an example technique of enhancing erasability of the erasable printout 330B. In contrast, the logic module/print module may identify that a font is to be affected less-aggressively to maintain readability. Similar analysis of images may be made, e.g., affecting lines differently than grayscales to enhance visual effect and minimize distortions. For example, a grayscale halftone 338B may be re-rendered using a threshold dot size of 250 microns, whereas line 336B may be re-rendered using a threshold line width of 200 microns. Rendering images in lower line screen or coarser resolution enables printing the gray area of halftone 338B with fewer larger dots (i.e., toner piles) which may be more easily removed. As an analogy, removing the larger toner dots may be like easily removing frozen rain drops from a windshield (in contrast to removing a thin sheet of ice frost on that windshield, to analogize the halftone 338A in FIG. 3A).

Regarding the flexibility in varying image rendering, it is possible to create dots of toner piles. Each toner pile may hold more toner in the erasable printout 330B compared to the standard printout 350A. In an example, even while having more toner per toner pile, it is possible to distribute the same amount of toner per area in both the erasable printout 330B and the standard printout 350A. For example, the larger toner piles in the erasable printout 330B may be spaced farther apart. Similarly, the toner piles in the erasable printout 330B may be taller compared to the toner piles in the standard printout 350A. Thus, the effective grayscale level of halftone 338A may be visually similar to the effective grayscale level of halftone 338B, despite the different dot/toner pile sizes used. The amount of toner used per area also may be the same between the halftone 338A and the halftone 338B, as well. However, these features may be selectively varied (e.g., based on analysis by a logic module and/or print module) as desired for erasability and visual effect. In an example rendering having color printout, the color dots may be placed so that they do not fall together on top of each other (as they might in a standard printout 350A). The color dots in an erasable printout 330B may be placed to be spread out, e.g., applied to an erasable media as a patterned half-tone according to a separate type of erasable printing engine for erasable printout 330B.

Erasable lines 336B in the erasable printout 330B may be rendered as larger lines and thus more easily erasable, compared to the very fine lines 336A in the standard printout 350A. If an image to be printed includes a fine line/dot (e.g., 100 microns wide for a laser printer), examples herein may render the image with a thicker line/dot (e.g., 200 or 250 microns wide) to enhance erasability. Such erasable lines 336B may appear relatively darker, and may use relatively more ink. However, the erasable lines 336B are much more erasable compared to the standard lines 336A, because the thicker erasable lines 336B are easier to interact with for erasure (e.g., the toner is easier to grab/disturb in the erasable lines 336B). In an alternate example, the logic module/print module may use dithering or other techniques to produce the erasable printout, such as substituting a dot matrix of disconnected (relatively large erasable) dots when rendering continuous lines, so as to visually simulate an effectively thinner continuous line without needing to use a thin dot/toner pile width.

Erasable font 334B may include fonts that do not include serifs (or other small and/or sharp features). The serifs may be removed from a font based on font substitution, and may be removed by image analysis to eliminate small visual features, and other techniques. The logic module/printer module may analyze an image to be printed, and identify whether to use font substitution or image analysis based on various features such as relative font size compared to threshold toner pile width, etc. In an example, the logic module/print module may identify that a font is very large (e.g., 32 point) compared to a threshold toner pile width, and therefore modify the font based on image analysis to make slight edits to the sharp edges of the font, while maintaining serifs and other features. In contrast, if the font is small (e.g., 8 point), the logic/print module may use font substitution. An example print module may examine a job to be printed and identify text-based information. The print module may substitute sans serif (or other) fonts for any fonts that have serifs or other small features in the print job, for example. Such modifications to substitute fonts also may be performed at a software driver level, before a job is sent to a printer. Even for a print job having no fonts embedded, an image to be printed as an erasable printout may be rendered and altered according to visual rules that have the effect of changing the fonts of images (e.g., thickening lines to meet a threshold toner pile width), that may remove serifs or other small features without specifically substituting a font.

The erasable printout 330B may be produced based on a threshold toner pile width. The threshold toner pile width may describe a width of a feature of a printout before fusing (e.g., when rendering) and/or after fusing the toner onto a media page. Toner pile sizes may be adjusted to meet the threshold toner pile width when rendering. The adjustment may compensate for spreading of the toner pile size when fusing, such that the fused toner pile size of the printout conforms to the threshold toner pile width. It is possible to determine a correspondence between toner pile sizes (including lines, dots, and/or other features of an image/font) before fusing and after fusing, such that the target conditions may be equated to each other. Accordingly, the term threshold toner pile width (or equivalents such as dot/line width) as used herein may include references to toner piles before fusing (e.g., when rendered) as well as toner piles after fusing (e.g., as they would appear on an erasable printout).

As an example, a print preview may illustrate how an erasable printout will look after fusing on the media page. For example, the print preview may show a threshold toner pile width corresponding to 200 microns as it would exist fused on a printed media page. However, to render the image to cause such a printed threshold toner pile width of 200 microns (or 250 microns, or other widths as appropriate for a printed feature), a print module may use a narrower rendered toner pile width (e.g., 160 microns). Accordingly, subsequent printout may result in line broadening and/or smashing, causing the narrower rendered toner pile width to enlarge to meet the target threshold toner pile width. Such adjustments and effects may be predicted based on the determined correlation between the rendered and printed toner pile sizes, which may compensate for different fusing engines, media types, media coating layers, and other physical attributes external to the logic/print modules.

Figure 4A:
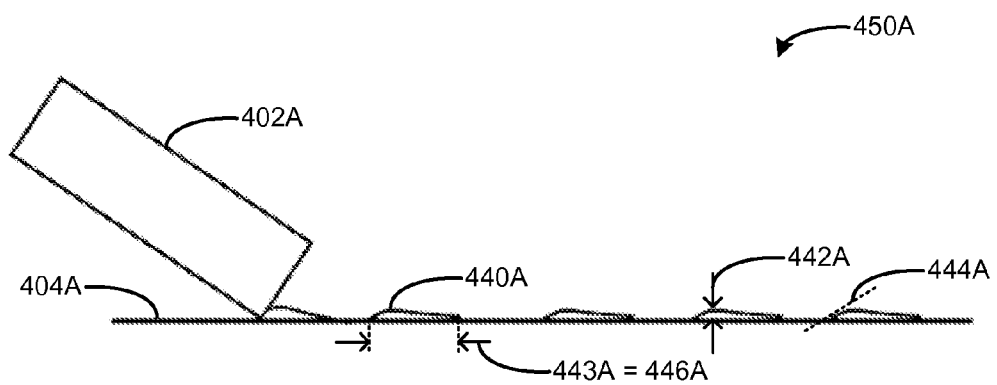
FIG. 4A is a block diagram of a standard printout illustrating a standard toner pile from a print module according to an example.

FIG. 4A is a block diagram of a standard printout 450A illustrating a standard toner pile 440A from a print module according to an example. The standard toner pile 440A is disposed on a standard media 404A. The standard toner pile 440A is associated with a standard toner pile height 442A, a standard toner pile steepness 444A, and a standard toner pile width 443A that is equal to a standard toner pile attachment interface 446A. FIG. 4A illustrates a printout disturber 402A in close proximity to the standard media 404A.

Fusing (e.g., melting) of the toner pile 440A may be performed using heat, pressure, or other techniques of applying energy to the toner pile 440A. Fusing may soften the toner material and enable it to chemically or physically fuse to the media 404A. As shown, the toner pile 440A is fully fused/melted and attached very well to the media 404A.

Printout disturber 402A may be used to disturb a toner pile 440A. Disturbing may enable at least a portion of a toner pile 440A to be removed (e.g., erased). The printout disturber 402A may be a blade, a shaped edge (e.g., unsharpened, sharpened, rounded, etc.) a brush, an ultrasonic transducer, or other tool to mechanically disturb an image (e.g., disturb a toner pile 440A) on a surface of the media 404A. Mechanically disturbing a toner pile 440A may enable that toner, used to create an image, to be more easily removed from the surface of the media 404A.

In an example, the printout disturber 402A may scrape or otherwise traverse the surface of the media 404A to mechanically interact with the fused toner piles 440A. The printout disturber 402A may have difficulty "catching" an edge of the toner pile 440A, and fail to release the toner pile 440A from the media 404A. The toner pile 440A is relatively flat and well-adhered to the media 404A, and therefore difficult to mechanically disturb and remove from the media 404A. For example, a toner pile attachment interface 446A corresponds to a toner pile width 443A, so that a widest possible portion of the toner pile 440A is adhered to the media 404A to provide a proportionally increased grip. The toner pile 440A is well-fused and thin. A toner pile height 442A is relatively low (e.g., compared to the toner pile width 443A), and the toner pile steepness 444A is relatively flat, providing difficulty in disturbing the toner pile 440A. For example, toner pile 440A may resist erasure, even after multiple passes of the printout disturber 402A. For example, multiple erasure passes may involve using additional erasure rotations, and thereby consuming additional energy and effort in an attempt to erase, in contrast to an erasable toner pile that may be erasable after a single pass.

Figure 4B:
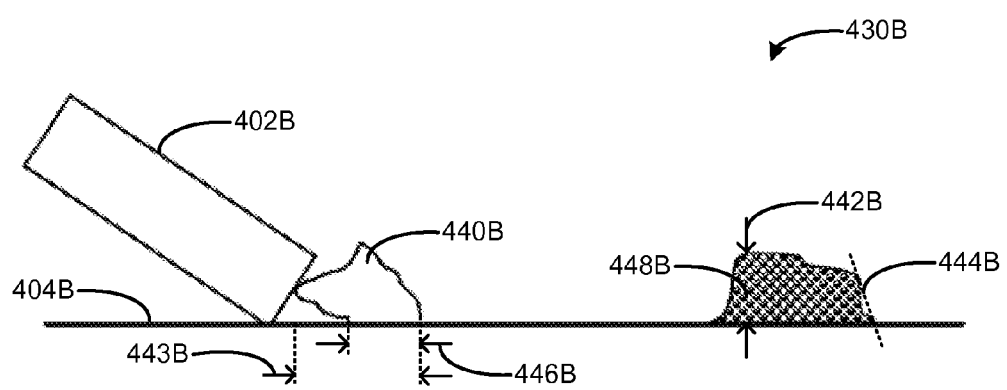
FIG. 4B is a block diagram of an erasable printout illustrating an erasable toner pile from a print module according to an example.

FIG. 4B is a block diagram of an erasable printout 430B illustrating an erasable toner pile 440B from a print module according to an example. The erasable toner pile 440B is disposed on an erasable media 404B. The erasable toner pile 440B is associated with an erasable toner pile height 442B, an erasable toner pile steepness 444B, an erasable toner pile width 443B, and an erasable toner pile attachment interface 446B. An erasable toner pile may be partially melted and/or sintered 448B. FIG. 4B illustrates a printout disturber 402B in close proximity to the standard media 404B.

Erasable toner pile 440B illustrates an example of providing an image for an erasable printout by using e.g., a higher toner pile height 442B in comparison to a standard toner pile 440A, a steeper toner pile steepness 444B, and a toner pile attachment interface 446B that is relatively smaller than a toner pile width 443B. Even when using such features (e.g., more toner per toner pile 440B), the relatively larger erasable toner piles 440B may provide an equivalent appearance visually when compared to the smaller, more numerous standard toner piles 440A of FIG. 4A (e.g., provide an equivalent halftone grayscale level). For example, the larger, taller erasable toner piles 440B are spaced apart further than the smaller, shorter standard toner piles 440A in FIG. 4A. The erasable features of the erasable toner pile 440B make it more easily disturbed and/or removed by the printout disturber 402B.

Thus, erasable toner pile 440B may be erasable with far less difficulty and energy required to remove the toner pile 440A of FIG. 4A. The physical attributes of the erasable toner pile 440B enable a mechanical force applied to the toner pile 440B to be leveraged by the physics of where the printout disturber 402B contacts the toner pile 440B. Thus, a cross-sectional profile of the toner pile 440B may differ from a profile of the substrate media 404B, so that the printout disturber 402B is likely to encounter and dislodge the toner pile 440B as the printout disturber 402B follows along the profile of the substrate media 404B during an erasure procedure.

A geometry of the erasable toner pile 440B may provide enhanced erasability by facilitating disruption of the fusion between the toner pile 440B and the media 404B. As shown, the geometry of erasable toner pile 440B provides a horizontal moment arm that extends laterally beyond a width of the toner pile attachment interface 446B. Thus, upon contacting the toner pile 440B, enhanced torque is applied to the toner pile attachment interface 446B, compared to the standard toner pile 440A of FIG. 4A. The torque also may be enhanced by a vertical moment arm provided by the toner pile height 442B. Such enhanced torques are complimentary to the effect that relatively reduced toner pile attachment interface 446B has on enabling the toner pile 440B to be dislodged from the media 404B.

The erasable toner pile 440B may be formed as a result of different techniques, such as use of partial fusing, melting, and/or sintering. Partially melted/sintered toner pile 448B illustrates that voids may be formed. Thus, for a given width/area of the partially fused/sintered toner pile 448B, less toner material is in contact with the media 404B, providing a reduced grip compared to a fully fused toner pile that may be more deeply fused into the media 404B.

Partial fusing/sintering may enable toner to be formed by a print module into a toner pile 448B, without fully melting and/or liquefying the toner pile 448B. Thus, the toner pile 448B may retain vertical and horizontal features by avoiding flattening out. Melting may be achieved by exposing toner to temperatures that exceed $T_g$ for that toner, whereby surface tension for a toner pile breaks down to where the toner particles will adhere to each other. Partial melting may be achieved by adjusting a temperature used by the print module (e.g., using a temperature below a melting point of the toner), by adjusting a fusing duration used by the print module (e.g., using a shorter fusing time to avoid full melt), and/or by adjusting a type of toner to use a different melting temperature (e.g., using toner having a melting point (glass transition temperature $T_g$) that is higher than a fusing temperature used by the print module). Pressure may be applied by the print module to transfix (e.g., smash fuse) the partially fused/sintered toner piles 448B without the use of heat (and/or use of heat below $T_g$). Other techniques may be used (e.g., vibration, friction by ultrasonic agitation to generate a locally heated area, etc.) to fundamentally apply energy to, and thereby obtain, the toner pile 448B. In effect, it may be a desirable trait to provide a toner pile 448B that is sintered/less fused and/or less adhered to the media 404B, compared to a standard toner pile 440A of FIG. 4A that is securely adhered to media 404A. The erasable toner pile 440B, and/or the partially melted/sintered toner pile 448B, may be compatible with a release layer that may be applied to the media 404B. The release layer may further adjust the adhesion of the attachment interface formed with the media 404B.

The toner material itself may be varied, independent of changes to a print module fusing approach. For example, chemically prepared toner and/or agitated/ground toner may be used to achieve different characteristics. Agitated/ground toner may include small, sharp-edged particle chunks. Chemically prepared toner may be grown as smoother particles (e.g., "potatoes") that may approximate and/or deviate from perfect spheres. The differing characteristics of the particles that make up a given toner type enable production of toner piles having corresponding differing characteristics. For example, the "potato" toner particles may have a higher melting temperature, and/or resist fully melting to provide a partially melted/sintered toner pile 448B. Coarse-ground toner may be used to make a toner pile 440B that is more sharp-edged and chunky compared to a standard toner pile 440A of FIG. 4A. Thus, changes to the type of toner may contribute to the erasability of toner piles 440B, 448B produced from the different types of toners. In an example, a printer module may be associated with multiple toner reservoirs, and may produce a standard printout using toner from a first reservoir, and may produce an erasable printout using toner from the second reservoir.

Figure 5:
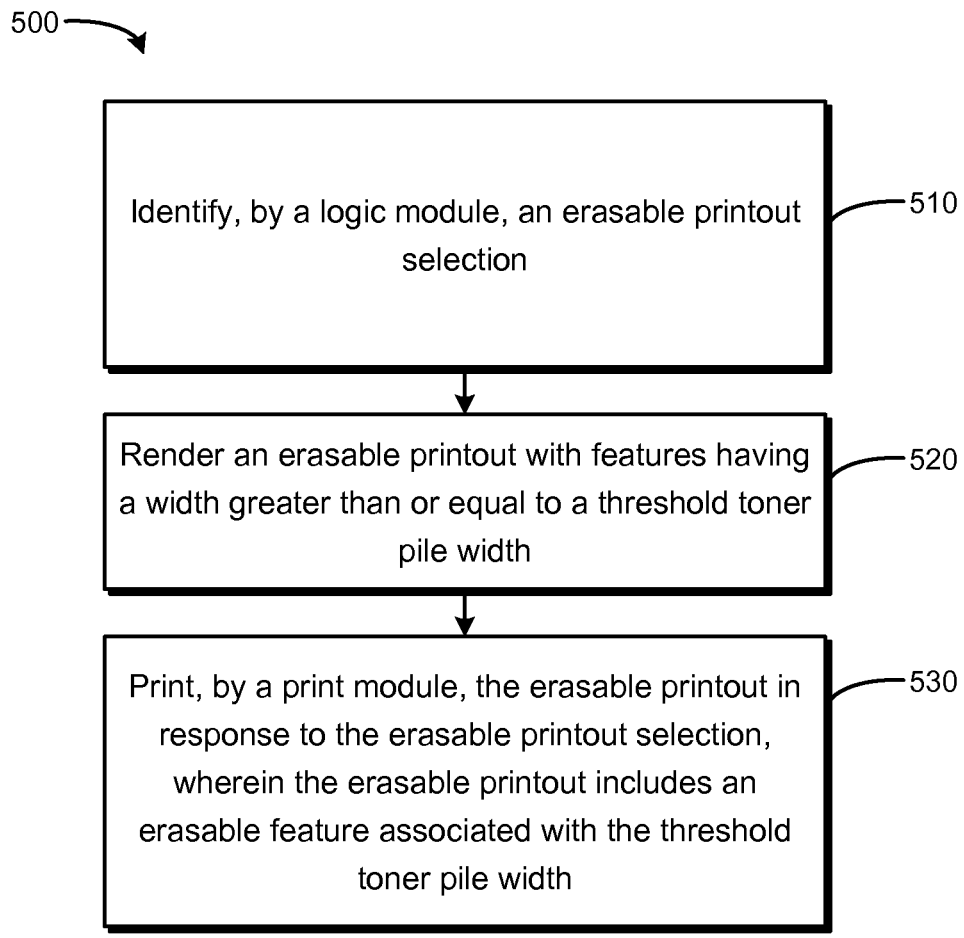
FIG. 5 is a flow chart based on printing an erasable printout according to an example.
Figure 6:
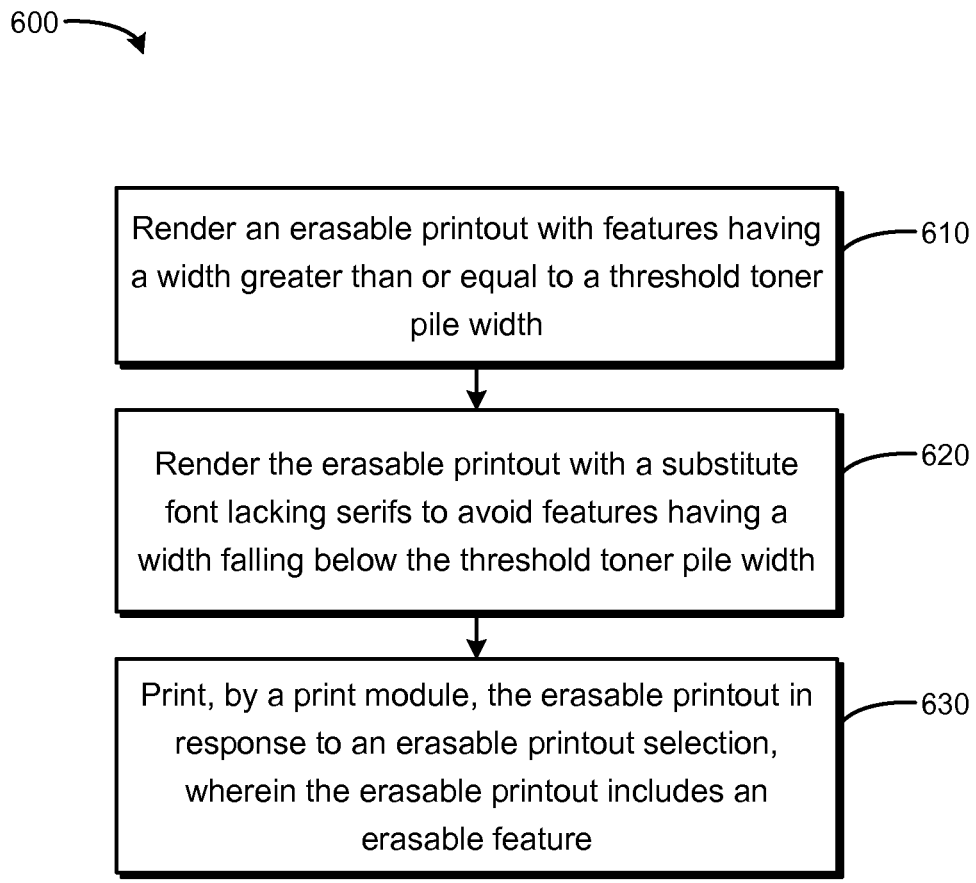
FIG. 6 is a flow chart based on printing an erasable printout according to an example.

Referring to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 5 is a flow chart 500 based on printing an erasable printout according to an example. In block 510, a logic module is to identify an erasable printout selection. For example, the logic module may receive a selection from a print driver, or may automatically choose the erasable printout by detecting available erasable media to be used, in contrast to using standard media. In block 520, an erasable printout is rendered with features having a width greater than or equal to a threshold toner pile width. For example, a halftone grayscale may be rendered to have features no smaller than the threshold toner pile width; a line may be thickened to meet or exceed the threshold; serifs or other features of fonts may be substituted/removed, and so on. Such features may be selectively applied, based on analysis of the image to be produced. In block 530, a print module is to print the erasable printout in response to the erasable printout selection, wherein the erasable printout includes an erasable feature associated with the threshold toner pile width. For example, the printout may correspond to a print preview, and may include erasable toner piles that are easily disturbed and removed from a sheet of media.

FIG. 6 is a flow chart 600 based on printing an erasable printout according to an example. In block 610, an erasable printout is rendered with features having a width greater than or equal to a threshold toner pile width. In block 620, the erasable printout is rendered with a substitute font lacking serifs to avoid features having a width falling below the threshold toner pile width. For example, a rendering/print engine may determine that a print job includes a Times New Roman font, and substitute a Sans Serif font to remove the serifs. In an alternate example, the print engine may analyze and selectively apply adjustments based on visual analysis of the image without substituting fonts, even if fonts are present. In block 630, a print module is to print the erasable printout in response to an erasable printout selection, wherein the erasable printout includes an erasable feature. For example, the erasable printout may be reusable multiple times, due to having toner piles that are not fully fused and include a toner pile attachment interface that is narrower than a width of the toner pile. Accordingly, erasable media may be rendered like-new and reusable many times.

Examples provided herein may be implemented in hardware, software, or a combination of both (e.g., as a software driver on a computing system to interact with a firmware component on a printer system). Example systems can include a processor and memory resources for executing instructions stored in a tangible non-transitory medium (e.g., volatile memory, non-volatile memory, and/or computer readable media). Non-transitory computer-readable medium can be tangible (e.g., a physical installation disc) and have computer-readable instructions stored thereon that are executable by a processor to implement examples according to the present disclosure.

An example system and/or apparatus (e.g., a computing device, a printer) can include and/or receive a tangible non-transitory computer-readable medium storing a set of computer-readable instructions (e.g., software). For example, the logic modules and print modules described herein may be part of a computer program running on a printer, and/or may be provided as part of a computer program running on a client computing system that interfaces with a printer. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on. Thus, the techniques provided herein may be provided as a software driver that enables a printer to provide erasable printouts.

What is claimed is:

1. An apparatus comprising:
a logic module to identify whether to print a standard printout or an erasable printout; and
a print module to print the erasable printout in response to the identifying by the logic module, wherein the erasable printout includes an erasable feature not present in the standard printout, and wherein the erasable feature includes a cross-sectional profile of a toner pile having an increased toner pile height compared to the standard printout.

2. The apparatus of claim 1, wherein the print module is to render the erasable feature by using coarser halftoning compared to the standard printout selection.

3. The apparatus of claim 1, wherein the erasable feature includes a cross-sectional profile of a toner pile having a steeper toner pile edge compared to the standard printout.

4. The apparatus of claim 1, wherein the erasable feature includes a toner pile attachment interface with a print media, wherein the attachment interface is narrower than a widest cross-section of the toner pile.

5. The apparatus of claim 1, wherein the erasable feature includes use of toner having a coarser average particle size compared to toner used for the standard printout.

6. The apparatus of claim 1, wherein the print module is to print the erasable printout based on a partially melted toner pile.

7. The apparatus of claim 6, wherein the partially melted toner pile is based on the print module using a lower erasable melting temperature $T_g$ for the erasable printout, compared to a standard melting temperature used for the standard printout.

8. The apparatus of claim 6, wherein the partially melted toner pile is based on the print module using a standard melting temperature applied to toner that melts at a higher melting temperature $T_g$ compared to toner used for the standard printout.

9. The apparatus of claim 1, wherein the print module is to print the erasable printout based on a sintered toner pile.

10. The apparatus of claim 1, wherein the print module is to print the erasable printout based on a compressed toner pile.

11. A method comprising:
identifying, by a logic module, an erasable printout selection; and
printing, by a print module, an erasable printout in response to the erasable printout selection, wherein the erasable printout includes an erasable feature associated with a threshold toner pile width, and the print module is to render the erasable printout with features having a width greater than or equal to the threshold toner pile width, and
wherein the erasable feature includes a cross-sectional profile of a toner pile having an increased toner pile height compared to the standard printout.

12. The method of claim 11, wherein the threshold toner pile width is substantially equal to or greater than 200 microns.

13. The method of claim 11, further comprising substituting a font, wherein the erasable feature is the lack of serifs in the substitute font to avoid features having a width falling below the threshold toner pile width.

14. A non-transitory machine-readable storage medium encoded with instructions executable by a computing system that, when executed, cause the computing system to:
identify, by a logic module, an erasable printout selection; and
send, to a print module, information to be printed as an erasable printout, in response to the erasable printout selection; wherein the erasable printout includes an erasable feature, and wherein the erasable feature includes a cross-sectional profile of a toner pile having an increased toner pile height compared to the standard printout.

* * * * *